Aug. 17, 1965   E. H. A. PRESCOTT   3,201,647
SPEED CONTROL SYSTEM
Filed Nov. 13, 1961
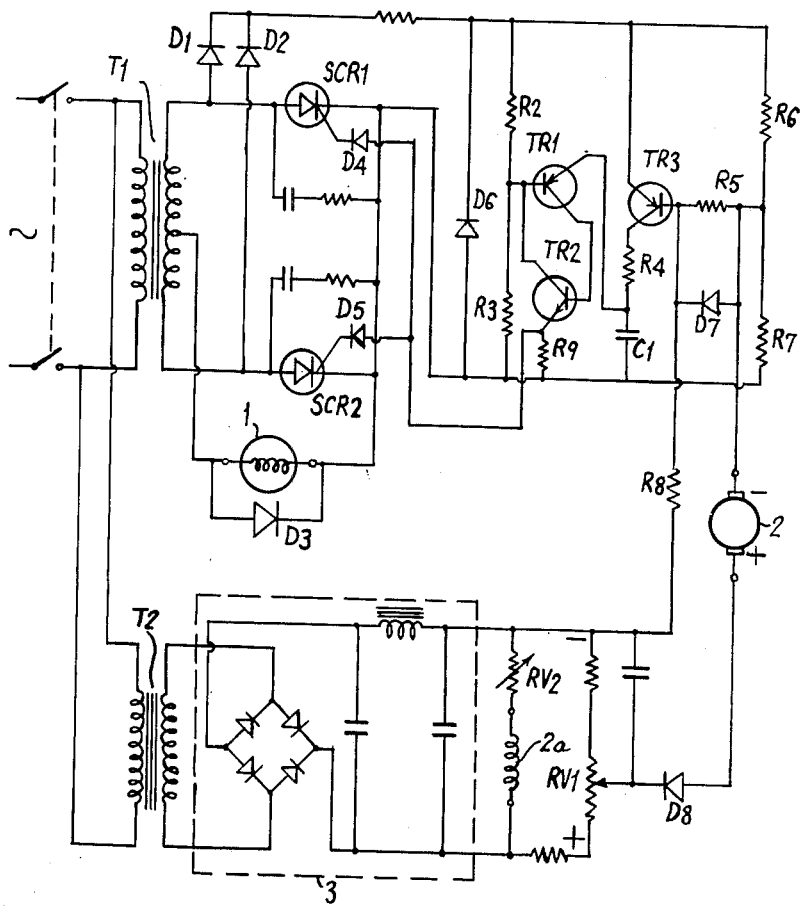
Inventor
E. H. A. Prescott
By
Holcomb Wetherill & Brisebois
Attorneys

United States Patent Office 3,201,647
Patented Aug. 17, 1965

3,201,647
SPEED CONTROL SYSTEM
Edward Horace Albert Prescott, Cambridge, England, assignor to Pye Limited, Cambridge, England, a British company
Filed Nov. 13, 1961, Ser. No. 151,977
Claims priority, application Great Britain, Nov. 18, 1960, 39,706/60
4 Claims. (Cl. 317—5)

The present invention relates to a speed control system for controlling the output speed of electromagnetic coupling devices, such as induction couplings.

According to the present invention a speed control system for controlling the output speed of an electromagnetic coupling device includes a tachometer generator driven from the output shaft of the coupling device and producing a voltage proportional to the speed of said output shaft and a full wave rectifier circuit producing the excitation current for said electromagnetic coupling device and comprising a pair of semiconductor controlled rectifiers, the conductance of said rectifiers being controlled in dependence upon an error signal derived from a comparison of the output voltage from the tachometer generator with a reference voltage representing the desired speed of rotation for the coupling. The semiconductor controlled rectifiers advantageously comprise silicon controlled rectifiers the firing angle of which is controlled by pulses developed in a pulse generator circuit. The pulse generator circuit preferably employs transistors.

In order that the invention may be more fully understood reference will now be made to the accompanying drawing which is a circuit diagram of one embodiment of speed control system according to the invention.

Referring to the drawing, the current to the excitation coil of the induction coupling 1 is supplied by a full wave rectifier circuit employing silicon controlled rectifiers, SCR1 and SCR2 fed from transformer T1. A positive voltage to the trigger electrode of these rectifiers will cause positive gate current to flow and when this is of sufficient magnitude the PNPN structure will break down providing the anode voltage is positive, causing current to flow in the excitation coil. This coil current will continue to flow until the rectifier which is conducting has its anode voltage removed or made negative. The rectifiers therefore respectively conduct upon opposite half cycles of the A.C. voltage applied to their anodes from the transformer T1.

Since the gate power requirements of these rectifiers vary considerably, the only effective method of controlling the firing angle is by pulse firing. The firing pulse generator circuit comprises transistors TR1, TR2 and TR3. Transistors TR1 and TR3 are of the PNP type and transistor TR2 is of the NPN type. Diodes D1 and D2 provide supply voltage to the transistor firing circuit from the secondary of transformer T1 and a zener diode D6 maintains this voltage constant. The voltage across resistor R3 is constant and derived from the potential divider R2 and R3. This initially makes the base of TR1 positive with respect to its emitter since condenser C1 has to charge through TR3 and resistor R4. When the base-emitter voltage of TR1 causes emitter current to flow, TR2 has a base current of $\alpha Ie$, and thus "bottoms" very rapidly due to a high value of $\beta$. The collector current of TR2 causes the voltage across R3 to fall, and regenerative action takes place causing a sharp pulse to be developed across resistor R9. This is fed to the rectifiers SCR1 and SCR2 by diodes D4 and D5, causing the rectifier which then has a positive anode voltage to fire. Since the supply voltage to the transistor circuit is across the rectifiers, this voltage will collapse until the next cycle of operation.

Transistor TR3 controls the rise time of the voltage across condenser C1. This transistor is "bottomed" by the bias network formed by resistors R6 and R7, with feedback resistor R5. This means that with no error voltage from the control loop, which includes the outputs of potentiometer RV1 and tachometer generator 2 in series opposition, the silicon controlled rectifiers will fire over the maximum firing angle, governed solely by the magnitude of resistor R4.

The reference voltage representing the desired running speed for the coupling is selected by potentiometer RV1 fed from the bridge rectifier circuit 3 supplied by transformer T2, and connected in series opposition with the output from the tachometer generator 2 driven by the output shaft of the coupling. When the output voltage from the tachometer generator 2 is low compared with the reference voltage from potentiometer RV1, diode D8 prevents current flow in the control loop. When the tachometer generator has run up to speed, current flows round the loop, assisting the feedback voltage across R5 and controlling the charging resistance to condenser C1, thus controlling the firing angle of the silicon controlled rectifiers and hence the speed of the induction coupling 1. In the extreme condition when the tachometer generator voltage is maximum and the reference voltage is reduced to zero, the zener diode D7 limits the voltage across R5, the wattage being developed in R8. Since the gain of the system is high the resistance values of RV1 and R8 are high, limiting the armature current taken from the tachometer generator.

The system is sensitive and its power handling depends on the rating of the silicon controlled rectifiers. The system can control very large powers with appropriate rectifiers. A regulation figure of 6% has been attained.

The diode D3 is connected across the coupling 1 in such a manner as to allow current, caused by inverse E.M.F.'s across the coupling to circulate in the closed circuit of diode D3 and coupling 1. The diode D3 therefore protects the silicon controlled rectifiers from the high inverse voltages which would be present if no current path were available when the rectifiers are in the non-conducting state.

The variable resistor RV2 is provided to vary the field current through the field winding 2a of the tachometer generator 2, enabling a maximum speed to be set for the maximum reference voltage which appears across RV1.

The induction coupling 1 may be of the kind described in our Patent No. 3,054,006.

Whilst a particular embodiment has been described it will be understood that various modifications may be made without departing from the scope of this invention.

I claim:

1. A speed control system for controlling the output speed of an electromagnetic induction coupling device, comprising a tachometer generator driven from the output shaft of the coupling device and producing a voltage proportional to the speed of said output shaft, a full wave rectifier circuit producing the excitation current fed to the excitation coil of said electromagnetic coupling device and comprising a pair of silicon controlled rectifiers, a pulse generator circuit for producing pulses for controlling the firing angle of the silicon controlled rectifiers, said pulse generator circuit including a capacitor, a first transistor whose conductance is controlled by the charge on said capacitor, a second transistor connected to the first transistor and whose conductance is controlled by the first transistor, an output load for said second transistor across which is developed the firing pulses for the silicon controlled rectifiers, a third transistor whose conductance controls the charging of said capacitor, a feedback resistor controlling the conductance of said third transistor, means for applying the output voltage from the tachometer generator and a reference voltage representing the desired running speed for said coupling in opposition across said feedback resistor, to control the conductance of said third transistor and hence the charging rate of said capacitor which in turn determines the conductance state of said first and second transistors and the duration of the firing pulses produced across the output load of said second transistor, whereby the conductance of said rectifiers controls the excitation current fed to the coupling and hence its speed as a function of the reference voltage.

2. A system as claimed in claim 1, in which the pulse voltage developed across the load of said second transistor is applied to the trigger electrodes of said pair of silicon controlled rectifiers through diodes.

3. A system as claimed in claim 1, in which the reference voltage is derived from an adjustable tapping on a potentiometer connected across a voltage source, and the field winding of said tachometer generator is also connected across said voltage source in series with a variable resistor whereby a maximum speed can be set for the maximum reference voltage which appears across said potentiometer.

4. A system as claimed in claim 1, including means for deriving the power supply to said pulse generator circuit from across said silicon controlled rectifiers, a first potential divider connected across said power supply, means connecting the base of said first transistor, which is of the PNP type, to an intermediate point on said first potential divider, means connecting the collector of said first transistor to the base of said second transistor, which is of the NPN type, means connecting the collector of the second transistor to the base of said first transistor, means connecting said output load to the emitter of said second transistor, means connecting said charging capacitor to the emitter of said first transistor and to the collector of said third transistor, which is of the PNP type, means connecting the emitter of said third transistor to one line of said power supply, means connecting the base of said third transistor to one end of said feedback resistor, and means connecting the other end of said feedback resistor to an intermediate point on a further potential divider connected across said power supply.

References Cited by the Examiner
UNITED STATES PATENTS

| | | | |
|---|---|---|---|
| 2,524,222 | 10/50 | Garde | 310—95 |
| 2,655,612 | 10/53 | Jaeschke | 310—95 |
| 2,659,832 | 11/53 | Jaeschke | 310—95 |
| 2,767,365 | 10/56 | Guggi | 318—327 |
| 2,850,654 | 9/58 | Jaeschke | 310—95 |
| 2,977,523 | 3/61 | Cockrell | 318—331 |
| 3,061,747 | 10/62 | Schlicher | 310—95 |

SAMUEL BERNSTEIN, *Primary Examiner.*